US011030385B2

(12) United States Patent
Mowatt et al.

(10) Patent No.: US 11,030,385 B2
(45) Date of Patent: Jun. 8, 2021

(54) ENHANCED PREVIEW TECHNOLOGY FOR APPLICATION ADD-INS

(71) Applicant: Microsoft Technology Licensing, LLC, Redmond, WA (US)

(72) Inventors: David Mowatt, County Dublin (IE); Terry Farrell, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/918,952

(22) Filed: Oct. 21, 2015

(65) Prior Publication Data

US 2016/0292135 A1 Oct. 6, 2016

Related U.S. Application Data

(60) Provisional application No. 62/139,872, filed on Mar. 30, 2015.

(51) Int. Cl.
| | |
|---|---|
| *G06F 40/106* | (2020.01) |
| *G06F 40/186* | (2020.01) |
| *G06F 3/0484* | (2013.01) |
| *G06Q 30/06* | (2012.01) |
| *G06F 8/61* | (2018.01) |

(52) U.S. Cl.
CPC ........ *G06F 40/106* (2020.01); *G06F 3/04842* (2013.01); *G06F 8/61* (2013.01); *G06F 40/186* (2020.01); *G06Q 30/0623* (2013.01); *G06Q 30/0643* (2013.01)

(58) Field of Classification Search
CPC ....... G06F 17/212; G06F 3/04842; G06F 8/61
See application file for complete search history.

(56) References Cited

U.S. PATENT DOCUMENTS

| | | | |
|---|---|---|---|
| 8,271,892 B2 | 9/2012 | Duncker et al. | |
| 8,336,043 B2 | 12/2012 | Lavery et al. | |
| 8,510,266 B1* | 8/2013 | Ho | G06F 16/275 |
| | | | 707/609 |
| 2006/0074869 A1* | 4/2006 | Rosenberg | G06F 17/212 |
| 2006/0117067 A1* | 6/2006 | Wright | G06N 5/02 |
| 2007/0083851 A1 | 4/2007 | Huang et al. | |
| 2007/0101251 A1* | 5/2007 | Lee | G06T 11/60 |
| | | | 715/205 |

(Continued)

FOREIGN PATENT DOCUMENTS

| | | |
|---|---|---|
| CN | 101063924 A | 10/2007 |
| CN | 102929609 A | 2/2013 |

(Continued)

OTHER PUBLICATIONS

"Second Written Opinion Issued in PCT Application No. PCT/US2016/024601", dated Feb. 28, 2017, 8 Pages.

(Continued)

*Primary Examiner* — Ariel Mercado

(57) ABSTRACT

Systems, methods, and software are disclosed herein for presenting add-in previews. In an implementation, a service receives a request for a preview of an application add-in. The service identifies a template document in response to the request and applies the application add-in to the template document to generate an enhanced preview of the application add-in. The service replies to the request with the enhanced preview.

20 Claims, 9 Drawing Sheets

(56) References Cited

U.S. PATENT DOCUMENTS

| | | | |
|---|---|---|---|
| 2009/0019020 A1* | 1/2009 | Dhillon | G06F 17/30398 |
| 2010/0005411 A1* | 1/2010 | Duncker | G06F 3/0482 |
| | | | 715/769 |
| 2012/0131470 A1* | 5/2012 | Wessling | G06F 21/105 |
| | | | 715/739 |
| 2012/0158644 A1* | 6/2012 | Mital | G06Q 10/06 |
| | | | 707/602 |
| 2013/0050509 A1* | 2/2013 | Kubo | G06F 8/61 |
| | | | 348/207.1 |
| 2013/0124700 A1 | 5/2013 | Miller et al. | |
| 2013/0145361 A1* | 6/2013 | Kaegi | G06F 17/3089 |
| | | | 717/176 |
| 2013/0187926 A1* | 7/2013 | Silverstein | G06Q 10/105 |
| | | | 345/440 |
| 2013/0198606 A1 | 8/2013 | Farrell et al. | |
| 2013/0283139 A1 | 10/2013 | Claux et al. | |
| 2014/0006214 A1 | 1/2014 | Paleja et al. | |
| 2014/0007262 A1 | 1/2014 | Metsapelto et al. | |
| 2015/0154156 A1* | 6/2015 | Meyers, Jr. | G06F 17/2235 |
| | | | 715/205 |

FOREIGN PATENT DOCUMENTS

| | | |
|---|---|---|
| CN | 104090862 A | 10/2014 |
| CN | 104094252 A | 10/2014 |
| CN | 104199806 A | 12/2014 |
| CN | 104331233 A | 2/2015 |
| CN | 104471566 A | 3/2015 |
| WO | 2013096021 A1 | 6/2013 |

OTHER PUBLICATIONS

"Load or Unload a Template or Add-In Program", Retrieved on: Mar. 19, 2015 Available at: https://support.office.com/en-us/article/Load-or-unload-a-template-or-add-in-program-2479fe53-f849-4394-88bb-2a6e2a39479d.

Bajaj, et al., "Install and Use Add-Ins in Office 2011 for Mac", Published on: Feb. 21, 2012, Available at: http://www.dummies.com/how-to/content/install-and-use-addins-in-office-2011-for-mac.html.

"International Search Report & Written Opinion Issued in PCT Application No. PCT/US2016/024601", dated Jun. 28, 2016, 12 Pages.

"International Preliminary Report on Patentability Issued in PCT Application No. PCT/US2016/024601", dated Jul. 13, 2017, 9 Pages.

"Office Action Issued in European Patent Application No. 16719584.1", dated Feb. 18, 2020, 5 Pages.

"Office Action Issued in Chinese Patent Application No. 201680019825.5", dated Feb. 25, 2020, 13 Pages.

"Second Office Action Issued in Chinese Patent Application No. 201680019825.5", dated Aug. 3, 2020, 15 Pages.

"Third Office Action Issued in Chinese Patent Application No. 201680019825.5", dated Nov. 30, 2020, 8 Pages.

* cited by examiner

ENHANCED PREVIEW TECHNOLOGY FOR APPLICATION ADD-INS

RELATED APPLICATIONS

This application is related to and claims priority to U.S. Provisional Patent Application No. 62/139,872, filed on Mar. 30, 2015, and entitled "Add-in Preview Technology," which is hereby incorporated by reference in its entirety.

TECHNICAL BACKGROUND

An application add-in is an application that runs in the context of another application. In the case of productivity applications, an add-in may provide a user with features of functionality that supplements and enhances the capabilities of a main productivity application. Application add-ins may be implemented as web-applications that access the document, email, or other content supported by the main application.

An add-in store provides users with a central repository for browsing and transacting for application add-ins to add to their applications. The add-in store may be accessible via a gallery rendered by an app-store application, a native application, a web-application, or any other type of application.

Informational cards on the add-ins can be viewed in the gallery and explain the basic features of a given add-in. For example, an information card may display various screen shots of the add-in and may describe in text how an add-in enhances an application. If desired, a user can select a purchase option in the card. Purchasing the add-in triggers it to be integrated into—or "added" to—the user's application(s) for future use.

Overview

Technology is disclosed herein that enhances application add-ins. In an implementation, an application gallery is presented that includes graphical representations of various application add-ins available through the gallery. The graphical representations may be, for example, icons or thumbnails that correspond to at least a subset of the add-ins in an application store. Titles may accompany the graphical representations in some implementations. When a given add-in (or its graphical representation) is selected, an enhanced preview of the application is generated. The enhanced preview may comprise a view of a document template (such as a word processing, spreadsheet, or presentation template) and the add-in as applied to the document.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein for enhancing the application add-in selection and/or evaluation process. The technology provides users with a customized and optimized experience for evaluating an add-in for an application (e.g. a visualization for Excel®) by letting them try out the add-in with sample data in the application.

In various implementations disclosed herein, application add-ins may be associated with template documents, such that an add-in can be previewed by launching an associated template document and applying the add-in to the document. A user can interact with the document and the add-in to receive a fully immersive and representative experience with the application add-in.

A technical effect provided by such solutions is the enhanced preview. In the past, a preview of an add-in consisted of an information card that a user could consume. The enhanced preview allows a user to interact directly with an application add-in. For example, users may see an on-hover panel or a full page with more details such as the description and screenshots for the add-in.

Such an interaction also reduces the computational steps previously required to have such an experience. In the past, to gain a fully immersive experience, a user would have to buy an add-in, provision it, and then open a document. If the experience was unsatisfactory, the user would then have to uninstall the application. In some implementations, a user might not yet even own or otherwise have authorized access to an application, in which case part of evaluating an add-in may include a trial of the application itself. For example, a lawyer looking for a legal marketing tool may discover an infographic add-in working in a legal template, and may get a trial of the slideshow application.

In various implementations disclosed herein, a "demo" option allows a user to enter a demonstration experience directly from an add-in gallery without having to set up an add-in. If not convinced, the user can simply decline to purchase the application add-in and need not perform any de-linking or de-provisioning steps. Such advantages save processing, computing, and network resources, in addition to streamlining the user experience. While examples disclosed herein refer to purchasing an application add-in, such transactions need not be strictly understood as purchases.

Rather, transacting for an add-in may involve obtaining a license, obtaining a trial period in which to use an add-in, or otherwise acquiring it in some other manner.

Figure 1:
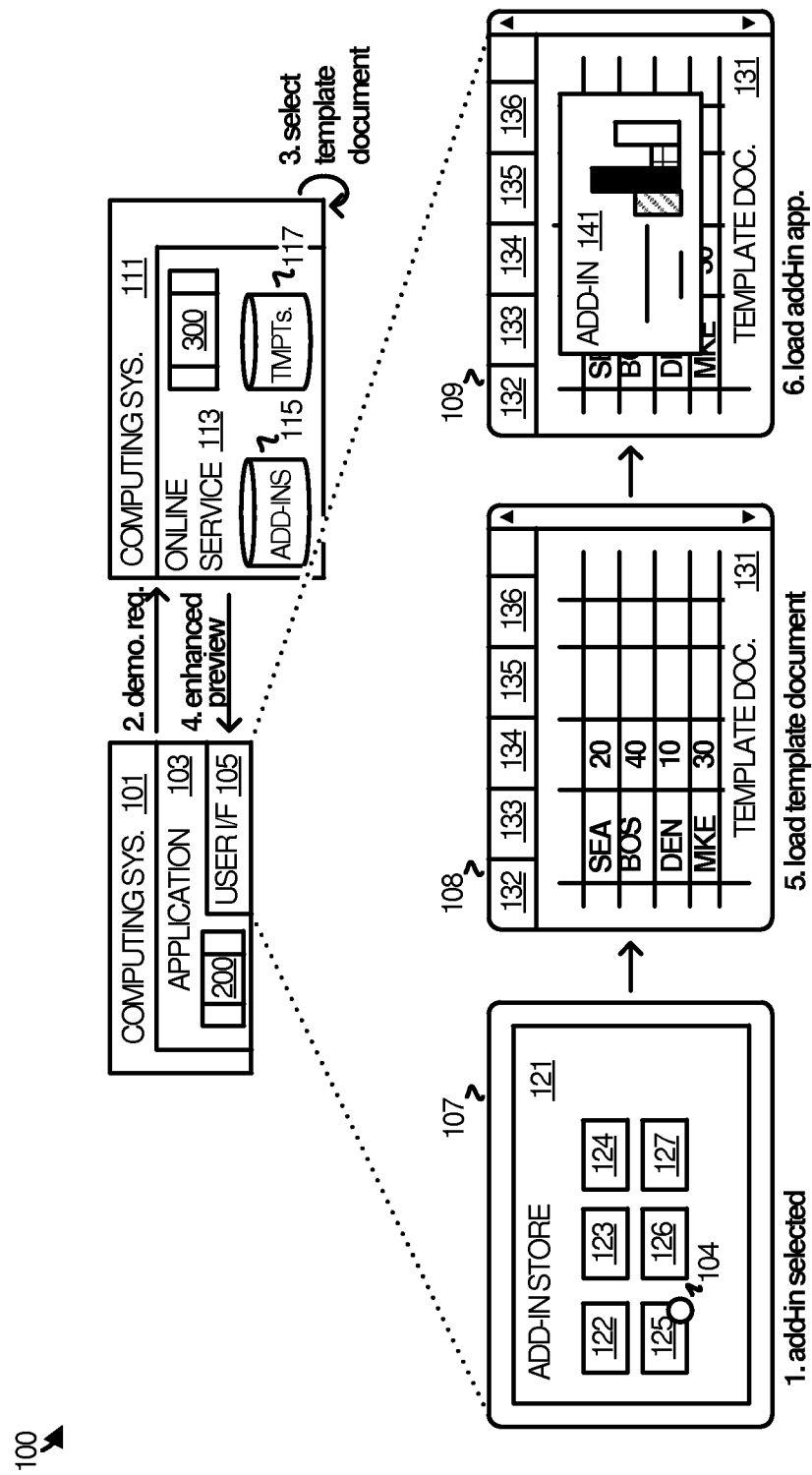
FIG. 1 illustrates an operational architecture and associated operational scenario in which enhanced application previews may be presented.

Referring to the drawings, FIG. 1 illustrates an operational architecture 100 and associated operational scenario in an implementation. Operational architecture 100 includes computing system 101 and computing system 111. Computing system 101 provides a runtime environment for application 103, while computing system 111 provides a runtime environment for online service 113.

Application 103 is representative of any application capable of employing an add-in preview process 200 and communicating with online service 113 in the context of facilitating enhanced add-in previews. User interface 105 provides a user interface to application 103 and online service 113.

Application 103 may be a natively installed and executed application, a browser-based application (or web-application), a streamed or streaming application, or any other kind of application. Examples of application 103 include, but are not limited to, productivity applications, personal information management applications, gaming applications, line-of-business application, database application, operating system applications, app-store applications, mobile applications, social network applications, and any variation or combination thereof.

Online service 113 is any service or combination of services capable of providing end-users with enhanced add-in experiences. Online service 113 may be a stand-alone service or may be integrated in the context of other services. Online service 113 employs add-in process 300 in the context of interacting with application 103. Examples of online service 113 include, but are not limited to, app-store services, online productivity services, gaming services, personal information management services, line-of-business services, social network services, and any variation or combination thereof.

In operation, a user interacts with user interface 105 to navigate to an add-in store 121 provided by online services 113. A view 107 presented in user interface 105 is of add-in store 121 (or a graphical representation thereof), which includes various application add-ins 122, 123, 124, 125, 126, and 127. The add-ins may be represented by icons, thumbnails, or some other selectable element in view 107. Fewer add-ins or more add-ins are possible and may be considered within the scope of the present disclosure.

The user makes a selection 104 of add-in 125 which triggers application 103 to communicate an add-in demonstration request to online service 113. Online service 113 selects an appropriate template document from templates database 117 and loads a corresponding application add-in from add-ins database 115. Online service 113 then replies to application 103 with an enhanced preview that includes the selected application add-in and the selected template document.

Application 103 transitions from view 107 in user interface 105 to view 108, which includes template document 131 and various controls 132, 133, 134, 135, and 136 for interacting with application 103. Next, application 103 loads the selected application add-in into view 109, represented by add-in 141. The user may thus interact with both the template document 131 and the add-in 141 in the context of an add-in demonstration.

Figure 2:
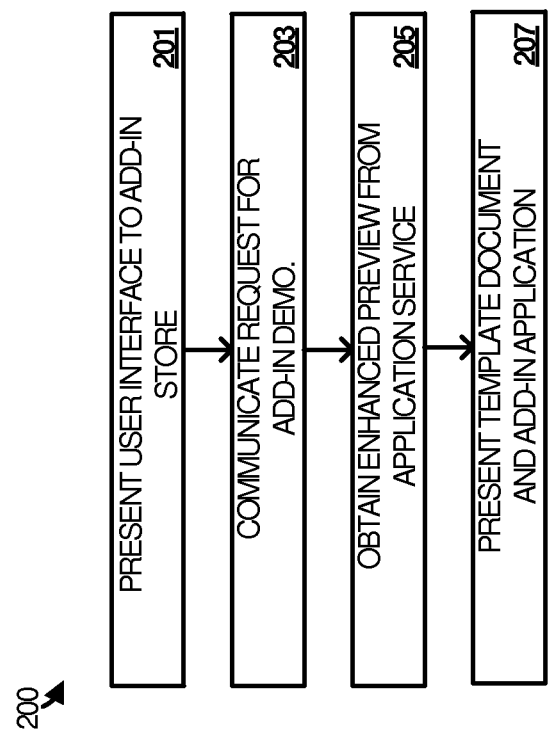
FIG. 2 illustrates an add-in preview process in an implementation.

FIG. 2 illustrates add-in process 200, which is representative of any software module(s), component(s), or other program instructions employed by an application to facilitate enhanced add-in previews. Referring parenthetically to the steps illustrated in FIG. 2, the application, of which application 103 is representative, presents a user interface to an application add-in store (step 201). A user selects an add-in from the store to demo, in response to which the application communicates a request to the online store (step 203).

The online store may return a selected template document and application add-in to the application, such by directing the application to an application service or other such location that hosts the template document, the application add-in, or both. The application obtains the enhanced preview from the application service (step 205) and presents it (document and add-in) in the user interface (step 207). The user may then interact with the document and the application add-in.

Figure 3:
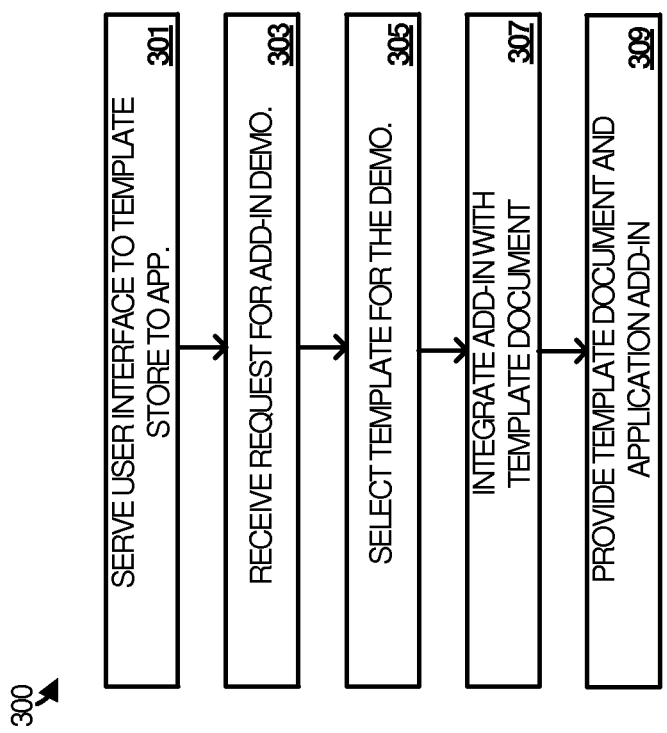
FIG. 3 illustrates an add-in preview process in an implementation.

FIG. 3 illustrates add-in process 300, which is representative of any software module(s), component(s), or other program instructions employed by an online service to facilitate enhanced add-in previews. Referring parenthetically to the steps illustrated in FIG. 3, the online service, of which online service 113 is representative, services a user interface to an add-in store (step 301). The user interface may include various icons, thumbnails, or other selectable representations of application add-ins.

The online service then receives a request from an application for a demonstration of a particular add-in from the add-in store (step 303). A template document is selected specifically in response to the request (step 305). For example, the template document may be selected based on an identity of a user associated with the request, profile or characteristic of the user, or some other user-specific information. In specific implementations, the template selected may depend on how the user browsed the add-in store and how they discovered the add-in. For example, if they typed 'legal marketing' they may see the add-in configured to run as a legal marketing add-in in a particular template. If they typed 'school report' they may see the same add-in for the same application shown in a different document template. Further to this the actual title and graphical representation of the add-in may be altered depending on the search query, browser behavior and/or certain targeted promotional campaigns that are being run.

The selected add-in is then integrated with the template document (step 307). This may occur dynamically after an add-in is selected. For instance, the online service may be associated with the template document such that when the template document is communicated to a user's application, the add-in is launched in association with the document. In other cases, the add-in may be associated with the document or a range of documents before the document is selected for the user.

Finally, the online service provides the enhanced preview including the template document and the application add-in to a local application for presentation to a user (step 309). Providing the enhanced preview may include sending a link that allows a browser application to open the document and the add-in. In other case, the document and add-in may be communicated as downloadable files.

Figure 4:
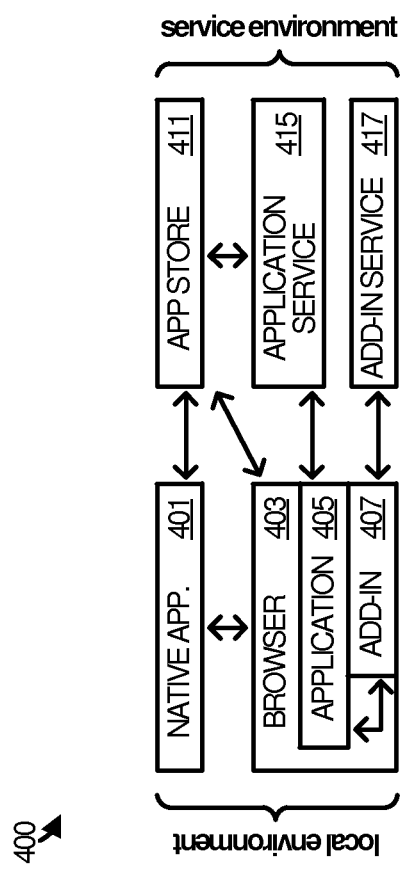
FIG. 4 illustrates an operational architecture in an implementation.

FIG. 4 illustrates another operational architecture, operational architecture 400, in an implementation of enhanced add-in previews. Operational architecture 400 includes a local runtime environment in which native application 401, browser 403, application 405, and add-in 407 run (once it has been added, in the case of add-in 407). The local environment may be provided by one or more physical or virtual computing systems, a representative example of which is provided by computing system 901 in FIG. 9.

Operational architecture 400 also includes a service environment that provides a runtime for app store 411, application service 415, and add-in service 417. The service environment may be provided by one or more physical or virtual computing systems, of which computing system 901 is representative. Each of app store 411, application service 415, and add-in service 417 may be provided by the same or one or more operational entities, such as software vendors, service providers, data center operators, or any other type of organizational entity. For example, app store 411 and application service 415 may be hosted by one entity, while add-in service 417 is hosted by a different entity. App store 411 may be a store for add-ins, applications, or both. (In some implementations, there may be no browser involved, but rather the add-in store is embedded into an application itself. Here the add-in may embed itself into a copy of the current document the user is editing or into a template as above. What runs is either a second smaller instance of the application windowed into the primary instance. Alternately, another instance of the application may be started to run alongside the other application.) Other types of relationships are possible and may be considered within the scope of this disclosure.

Native application 401 is representative of any software application that may be natively installed and executed on a computing device. Examples of native application 401 include, but are not limited to, productivity applications, personal information management applications, app-store applications, gaming applications, and any other type of native application, variation, or combination thereof.

Browser 403 is representative of any web-browsing application capable of providing an execution context in which web-applications run. Application 405 represents any web-application suitable for executing in the context of browser 403. In this implementation, application 405 may be considered a main application that add-in 407 supplements. Add-in application is also a web-application that executes in the context of browser 403, although below application 405 in a hierarchy of order and control.

In operation, application service 415 serves application 405 to browser 403 for rendering and presentation to a user. Similarly, add-in service 417 serves add-in 407 to browser 403 for rendering and presentation to a user, but in the context of application 405.

Native application 401 may be operatively communicative with app store 411 to, for example, request application add-ins from app store 411. Native application 401 is also capable of communicating with browser 403. App store 411 may also communicate with browser 403 and application service 415 as well.

Figure 5:
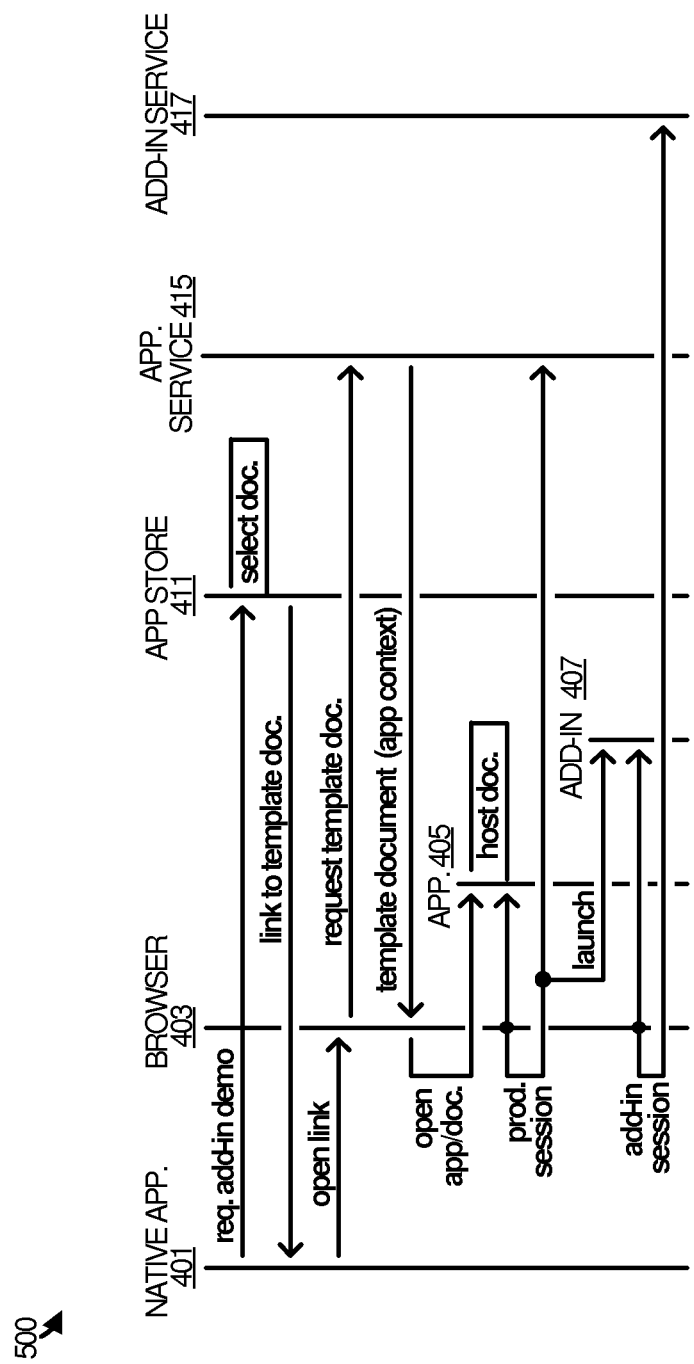
FIG. 5 illustrates an operational sequence in an implementation.

FIG. 5 illustrates an operational sequence 500 to better demonstrate various aspects of enhanced add-in preview technology. A user interacting with native application 401 may prompt native application 401 to request a demonstration of an application add-in. This may happen when, for example, the user navigates to a user interface to app store 411. The user interface may be provided by native application 401, although the user interface may be separate from native application 401. In fact, the demo request may be communicated by a software entity other than native application 401.

App store 411 receives the request and responsively selects a template document for the user. The template document may be selected based on the user's identity, characteristics of the user (such as their document history, preferences, and the like), or other factors. App store 411 returns a link to the template document to native application 401.

Native application 401 communicates with browser 403 to open the template document using the link. Browser 403 requests the document from application service 415 or some other repository that hosts the document. The template document is then opened in the context of application 405, at which point application 405 may be considered the host, although application 405 is a web-application and, as such, the document in a sense remains hosted by application service 415.

At about the same time that the template document is loaded, the selected application add-in is loaded. Add-in 407 may have been stored in association with the template document such that when the template document is loaded the add-in is loaded. Alternatively, add-in 407 could be loaded via a process separate from the document open process. Once add-in 407 is loaded it communicates with add-in service 417, which hosts the server-side implementation of add-in 407. As the user interacts with application 405, communications flow through browser 403 between application 405 and application service 415. Likewise, as the user interacts with add-in 407, communications flow through browser 403 between add-in 407 and add-in service 417.

Figure 6:
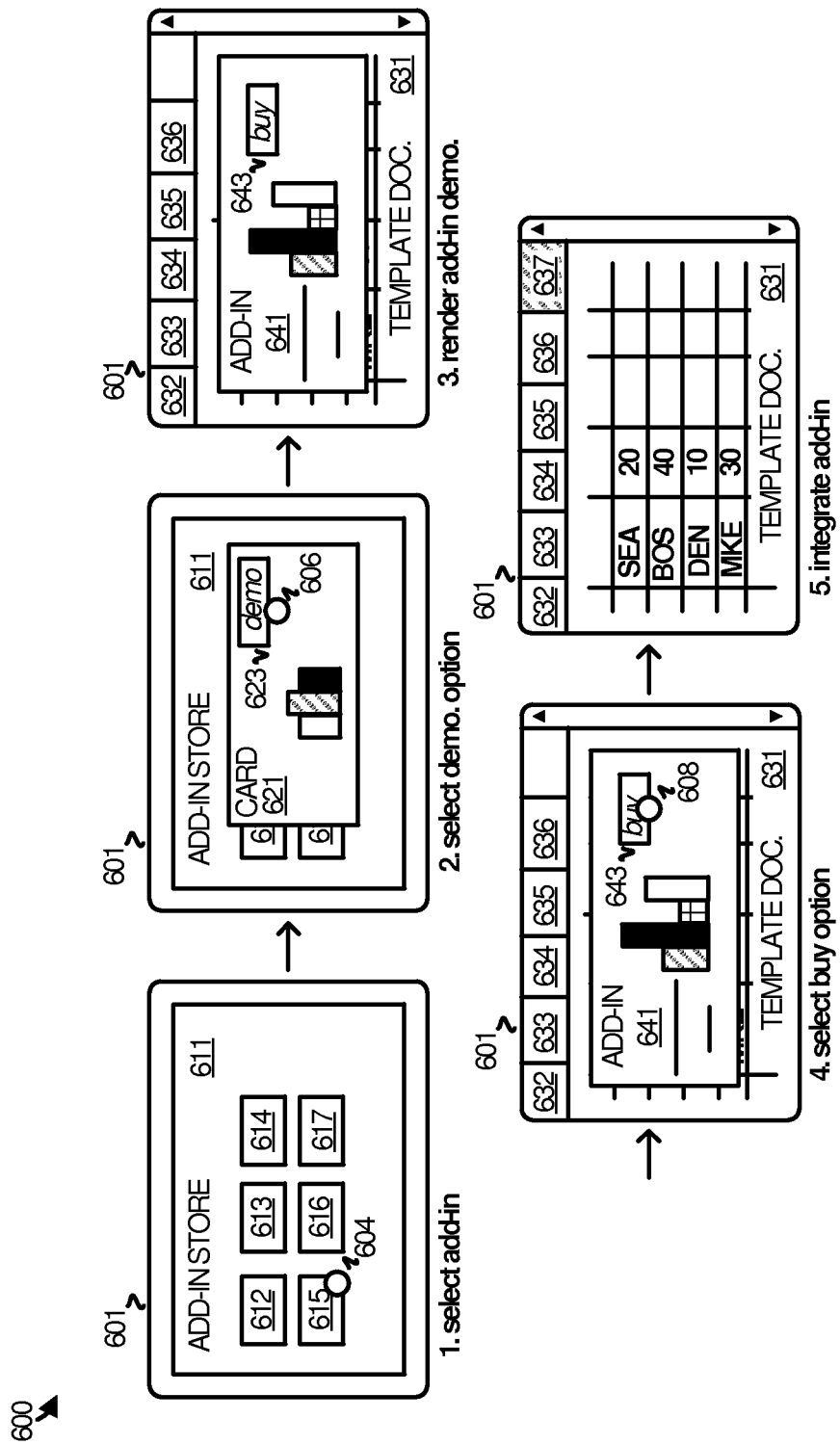
FIG. 6 illustrates an operational scenario in an implementation.

FIG. 6 illustrates operational scenario 600 to demonstrate various aspects of the user experience with respect to enhanced add-in preview technology. In operation, a user interface 601 initially includes an add-in store 611 (or a visual representation thereof). The add-in store 611 includes various graphical elements 612, 613, 614, 615, 616, and 617 that correspond to various application add-ins available to a user. The user makes a selection 604 of graphical element 615 which corresponds to a particular add-in.

An informational card 621 is responsively surfaced in user interface 601 that contains information descriptive of the selected application add-in. It is assumed for exemplary purposes that the selected add-in provides advanced chart or graph functionality. As such, informational card 621 provides a sample screen-shot of a graph and potentially other information about the features and functionality of the graph.

Informational card 621 also includes a demo button 623 that, when selected, triggers an enhanced preview process. When the user makes a selection 606 of the demo button 623, an enhanced preview of the selected add-in is rendered in user interface 601.

The enhanced preview process loads a template document 631 specific to the user in user interface 601. Various controls 632, 633, 634, 634, and 636 may be present in the user interface that allow the user to interact with template document 631. The controls may be features of a native application or hosted application in which template document 631 is opened, for example.

Add-in 641, which represents the selected add-in, is also loaded in user interface 601. Add-in 641 includes a chart produced from the data contained in template document 631. Add-in 641 also includes a buy button 643 that allows the user to purchase or otherwise transact to have the add-in permanently integrated into his or her application(s).

A selection 608 may be made of the buy button 643, at which point a back-end process executes to add the add-in 641 to the menu of application controls available in user interface 601. For example, control 637 is added to the user interface 601. Moving forward, the add-in 641 is thus available via control 637.

Figure 7:
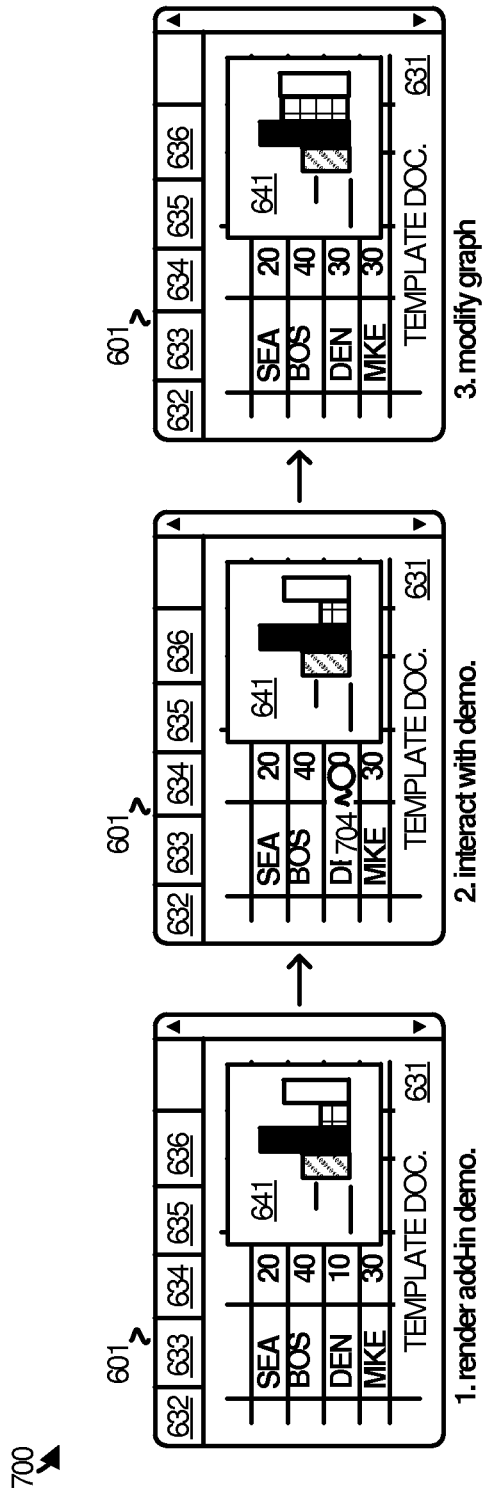
FIG. 7 illustrates an operational scenario in an implementation.

FIG. 7 illustrates operational scenario 700 which demonstrates additional aspects of enhanced preview technology. Operational scenario 700 illustrates benefits of enhanced add-in preview that are available to a user when interacting with an application add-in demonstration, before the user decides to transact for it.

In operation, user interface 601 is presented to the user in the context of an enhanced preview and includes template document 631 and add-in 641. User interface 601 also includes the controls 632, 633, 634, 635, and 636 for interacting with the template document 631 and/or features and functionality of the application in which template document 631 is opened.

The user may interact with the demonstration in a live, detailed manner, allowing the user to investigate and experience the benefits of add-in 641. For example, a user interaction 704 may occur that changes the value in a particular cell. Changing the value drives a change in the graph displayed in add-in 641. The value for "Denver" is changed from "10" to "30" based on additional analysis of Denver performed by the add-in for instance, which modifies the relative bar sizes in the graph. While this example is given in the context of one add-in as applied to one document, a user could experience the add-in in the context of multiple template documents. For instance, the user might try the add-in in the context of one template document and then select another template document to evaluate the add-in with, and then another, and so on.

Figure 8:
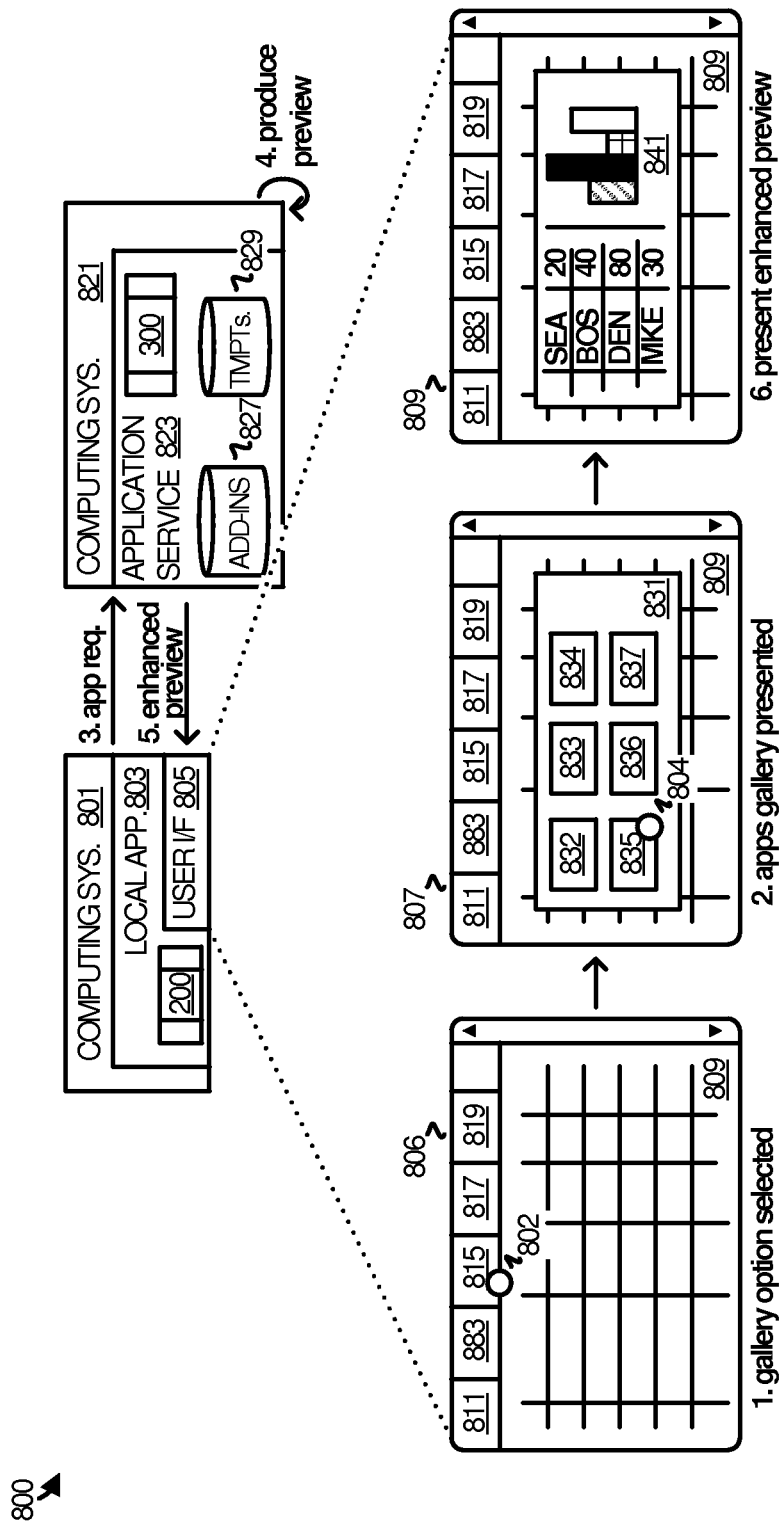
FIG. 8 illustrates an operational architecture and associated scenario in which enhanced application previews may be presented.

Referring to FIG. 8, operational architecture 800 is disclosed for providing enhanced add-in previews. Operational architecture 800 includes computing system 801, on which local application 803 is executed. Local application 803 communicates with application service 823, which executes on computing system 821.

Local application 803 is representative of any software application capable of receiving add-in galleries from an application service and presenting the galleries in a user interface. Local application 803 may be a stand-alone application or it may be implemented in a distributed manner as multiple applications. In addition, local application 803 may be a natively installed application, a browser-based application that executes in the context of a browser, a streaming application, or any other type of application, including any combination or variation thereof. Examples include, but are not limited to, productivity applications, such as word processing, spreadsheet, document editing, and presentation applications.

Application service 823 is representative of any software application or collection of applications capable of providing an application service to local applications. Application service 823 may be implemented within the context of another service, such as an online productivity service (such as Office365® offered by Microsoft®, or Google Docs® offered by Google®), an app store service, a multi-media service, or any other type of service. In some implementations, application service 823 may be implemented as a stand-alone service or a distributed service.

In some implementations, local application 803 may be an application store application that provides a user interface to an online application store, or app store. In such situations, local application 803 would request, receive, and present graphical representations of application titles available in the app store. An online service would curate a gallery of application titles, and would provide icons or other graphical representations of the titles for presentation by location application 803. Application service 821 may be an online application store service, may include such a service, or may interface to one.

Figure 9:
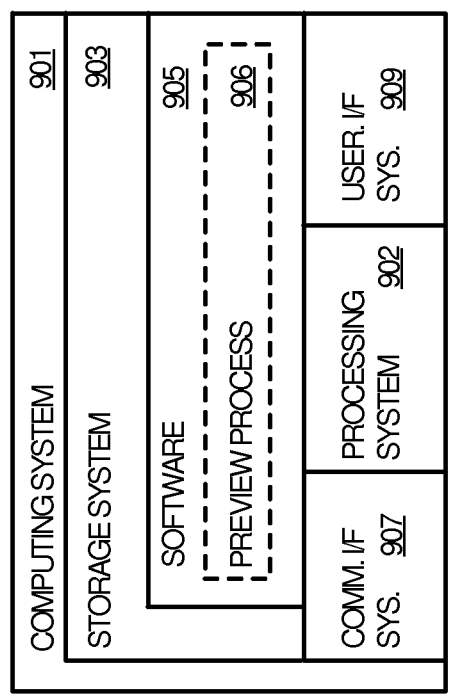
FIG. 9 illustrates a computing system suitable for implementing any of the architectures, processes, and operational scenarios disclosed herein with respect to the Figures and discussed below in the Technical Disclosure.

Local application 803 executes on computing system 801, which is representative of any physical or virtual computing system, device, or collection thereof capable of hosting local application 803 and implementing a preview process. Examples of computing system 801 include, but are not limited to, smart phones, laptop computers, tablet computers, desktop computers, hybrid computers, gaming machines, smart televisions, virtual machines, and wearable devices (e.g. smart watches), as well as any variation or combination thereof, of which computing system 901 illustrated in FIG. 9 is representative.

Computing system 821 is representative of any physical or virtual computing system, device, or collection thereof capable of hosting application service 823. Examples of computing system 821 include, but are not limited to, server computers, web servers, application servers, rack servers, blade servers, virtual machine servers, or tower servers, as well as any other type of computing system, of which computing system 901 illustrated in FIG. 9 is representative.

Referring now to the operational scenario illustrated in FIG. 8, local application 803 renders user interface 805, which includes view 806 of a document (e.g. spreadsheet). View 806 includes various menu options, of which options 811, 813, 815, and 817 are representative. Option 815 comprises an option to navigate to an add-in gallery.

Option 815 is selected by a user engaged via user interface 805, which transitions view 806 to view 807. View 807 includes a gallery 831 of various graphical representations of application add-ins available from application service 823 (or an app store). Gallery 831 includes thumbnails 832, 833, 834, 835, 836, and 837.

Another user selection 804 is made of a particular thumbnail 835. Selection of thumbnail 835 triggers local application 803 to request a preview of an add-in associated with thumbnail 835. Application service 823 produces an enhanced view of the add-in from an add-ins repository 827 and a templates repository 829.

Application service 823 returns the enhanced preview to local application 803. Local application 803 renders the enhanced preview in user interface 805 through view 809. View 809 includes enhanced preview 841, which is representative of a preview that may be produced by applying an add-in to a template document.

The enhanced add-in preview technology disclosed herein may be beneficial in a variety of operational settings. Many large software companies (Microsoft®, Google®, Salesforce®, Adobe®) have extended their key productivity offerings (Excel®, Google Docs®, Photoshop®) by allowing 3rd party companies to build application add-ins/extensions that extend what their products do. For example, Photoshop® may have custom photo filters, Google® may have a bibliography add-in, and Microsoft® may have a document signing add-in. What is key in all these cases is that the add-in is not a fully immersive app in itself, but rather a bolt-on addition to the main product. The add-in invariably lets you create a more compelling, complete or better web-connected end product.

Unlike add-ins, documents can be opened by a productivity application, so developers can advertise links on their sites to open a document in Microsoft® Word® Online, or in Google® Docs that includes an add-in. This dramatically increases the discovery and effectiveness of an application add-in by web users.

Document templates are versatile in that they help to complete tasks faster or with increased aesthetic quality. A document combined with an add-in can help a user have a better experience, and thus one that is more likely to result in the user being convinced to transact for the add-in, than if the add-in is opened in a blank document.

Personalization can let the system open up the best template for the user, given what may be known about the user. This may take the form of task-personalization (e.g. a document signing app could be embedded in a real estate template or an employee contract template) or persona-personalization (e.g. a template that highlights how a CRM app is great for a small business, or for a large company), etc.

The document template containing the app can become another bit of content that app store developers can alter and experiment with to optimize user engagement. The 'find and try' experience is transformed from one where the user is given a dead end (e.g. they acquire the app, but aren't given any obvious path to try it out) to a smooth flow that engages the user (e.g. they acquire the app and are immediately trying it in the context of a realistic document).

The app store concept has been replicated by many companies including Microsoft®, Apple® and Google®. In recent years, app stores have begun to allow the app developer to augment their apps (often games) with in-app purchases, such as purchasing cows for the game Farmville®. Thus the base 'app' is augmented with extras provided by the same software developer who wrote the app. Recently, notably in productivity software, apps have been augmented with add-ins provided by 3rd parties. Thus the Microsoft® Outlook® app may be augmented by a CRM add-in provided by Insightly® Inc.

Enhanced add-in previews as disclosed herein enable effective trials for web-based marketing for productivity software add-ins by surfacing links that open one of several document templates (containing those add-ins) in productivity software. Multiple factors may be considered to bias which template is chosen. Such a solution may be replicated across multiple productivity solutions, from email to spreadsheets to painting applications and more. The solution may be delivered an App Store distributing apps/add-ins by 3rd parties. In addition, the solution may be provided even when a user is potentially not signed in to a productivity application. Analytics may be employed to examine repeat usage/purchase of an add-in within a template to bias the choice of which users should be given which template to try out the add-in.

FIG. 9 illustrates computing system 901 that is representative of any system or collection of systems in which the various operational architectures, scenarios, and processes disclosed herein may be implemented. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, container, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes preview process 906, which is representative of the preview processes discussed with respect to the preceding Figures, including add-in process 200 and add-in process 300.

When executed by processing system 902 to enhance add-in preview capabilities, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 2, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced preview production and presentation.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include preview process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced add-in previews. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A computing system comprising: one or more computer readable storage media; a processing system operatively coupled with the one or more computer readable storage media; and program instructions stored on the one or more computer readable media that, when read and executed by the processing system, direct the processing system to at least: communicate a request to an app store for a preview of an add-in to an application; receive the add-in and a template document in reply to the request to the app store for the preview; and render the preview in a user interface to the application, wherein the preview comprises the template document and the add-in.

Example 2

The computing system of Example 1 wherein the application comprises a web-application hosted in a browser application and wherein to render the preview, the program instructions direct the processing system to load the preview of the add-in to the application in the browser application.

Example 3

The computing system of Examples 1-2 wherein the program instructions direct the processing system to communicate the request to the app store in response to a user selection of the add-in from an add-in gallery.

Example 4

The computing system of Examples 1-3 wherein the application comprises a native application wherein to render the preview, the program instructions direct the processing system to load the preview of the add-in to the application in the native application.

Example 5

The computing system of Examples 1-4 wherein the application comprises a productivity application and wherein the add-in store comprises a service for selecting application add-ins to run in association with at least the productivity application.

Example 6

The computing system of Examples 1-5 wherein each of the application add-ins comprises a web-app that runs in association with the productivity application.

Example 7

A method of operating an online service comprising: receiving a request for a preview of an application add-in; identifying a template document in response to the request; generating an enhanced preview of the application add-in comprising the application add-in loaded in the template document; and replying to the request with the enhanced preview.

Example 8

The method of Example 7 wherein the online service comprises an add-in store and a hosted productivity application.

Example 9

The method of Examples 7-8 wherein receiving the request for the preview of the application add-in comprises receiving the request in the add-in store.

Example 10

The method of Examples 7-9 wherein receiving the request in the add-in store comprises receiving the request from a local productivity application.

Example 11

The method of Examples 7-10 wherein replying to the request with the enhanced preview comprises the hosted productivity application serving the template document.

Example 12

The method of Examples 7-11 wherein receiving the request in the add-in store comprises receiving the request from the hosted productivity application.

Example 13

The method of Examples 7-12 wherein replying to the request with the enhanced preview comprises the hosted productivity application serving the template document.

Example 14

An apparatus comprising: one or more computer readable storage media; program instructions stored on the one or more computer readable storage media that, when executed by a processing system to operate an online service, direct the processing system to at least: identify a template document in response to a request for a preview of an application add-in; and reply to the request with an enhanced preview of the application add-in comprising the application add-in loaded in the template document.

Example 15

The apparatus of Example 14 wherein the online service comprises an add-in store and a hosted productivity application.

Example 16

The apparatus of Examples 14-15 wherein receiving the request for the preview of the application add-in comprises receiving the request in the add-in store.

Example 17

The apparatus of Examples 14-16 wherein receiving the request in the add-in store comprises receiving the request from a local productivity application.

Example 18

The apparatus of Examples 14-17 wherein replying to the request with the enhanced preview comprises the hosted productivity application serving the template document.

Example 19

The apparatus of Examples 14-18 wherein receiving the request in the add-in store comprises receiving the request from the hosted productivity application.

Example 20

The apparatus of Examples 14-19 wherein replying to the request with the enhanced preview comprises the hosted productivity application serving the template document.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing system comprising:
   one or more computer readable storage media;
   a processing system operatively coupled with the one or more computer readable storage media;
   program instructions stored on the one or more computer readable storage media that, when executed by the processing system, direct the processing system to at least:
   display an electronic document in an application, the electronic document comprising first data having a first plurality of values;
   communicate a request to an app store for a preview of an add-in to the application;
   receive, in reply to the request to the app store for the preview, the add-in and an automatically selected template document that includes second data the add-in may interact with, wherein the second data has a second plurality of values that are different than the first plurality of values;
   render and display an interactive preview in a user interface to the application, wherein the interactive preview comprises the template document with the second data and the add-in, and wherein the second data in the template document may be interacted with via the interactive preview for modifying one or more display results of a feature supported by the add-in;
   receive an interaction that edits a value of the second data in the template document;
   modify, based on the received interaction, a display result of a feature supported by the add-in corresponding to the edited value;
   communicate a request to the app store for a second template document to preview the add-in with;
   receive the second template document; and
   render and display a second interactive preview in the user interface to the application, wherein the second interactive preview comprises the second template document and the add-in, and wherein data in the second template document may be interacted with via the second interactive preview for modifying one or more display results of another feature supported by the add-in.

2. The computing system of claim 1 wherein the application comprises a web-application hosted in a browser application and wherein to render the preview, the program instructions direct the processing system to load the preview of the add-in to the application in the browser application.

3. The computing system of claim 2, wherein the program instructions direct the processing system to communicate the request to the app store in response to a user selection of the add-in from an add-in gallery.

4. The computing system of claim 1 wherein the application comprises a native application and wherein to render the preview, the program instructions direct the processing system to load the preview of the add-in in the native application.

5. The computing system of claim 1, wherein the program instructions, when executed by the processing system, further direct the processing system to: automatically select the template document based on one or more profile characteristics associated with a user account from which the add-in request has been communicated.

6. The computing system of claim 1, wherein the program instructions, when executed by the processing system, further direct the processing system to: automatically select the template document based on one or more user preferences associated with a user that generated the preview request.

7. The computing system of claim 1, wherein the program instructions, when executed by the processing system, further direct the processing system to: automatically select the template document based on a document history associated with a user that generated the preview request.

8. A computer-implemented method comprising:
   displaying an electronic document in an application, the electronic document comprising first data having a first plurality of values;
   communicating a request to an app store for a preview of an add-in to the application;
   receiving, in reply to the request to the app store for the preview, the add-in and an automatically selected template document that includes second data the add-in may interact with, wherein the second data has a second plurality of values that are different than the first plurality of values;
   rendering and displaying an interactive preview in a user interface to the application, wherein the interactive preview comprises the template document with the second data and the add-in, and wherein the second data in the template document may be interacted with via the interactive preview for modifying one or more display results of a feature supported by the add-in;
   receiving an interaction that edits a value of the second data in the template document;
   modifying, based on the received interaction, a display result of a feature supported by the add-in corresponding to the edited value;
   communicating a request to the app store for a second template document to preview the add-in with;
   receiving the second template document; and
   rendering and displaying a second interactive preview in the user interface to the application, wherein the second interactive preview comprises the second template document and the add-in, and wherein data in the second template document may be interacted with via the second interactive preview for modifying one or more display results of another feature supported by the add-in.

9. The computer-implemented method of claim 8, wherein the application comprises a web-application hosted in a browser application and wherein rendering the preview further comprises loading the preview of the add-in to the application in the browser application.

10. The computer-implemented method of claim 9, further comprising communicating the request to the app store in response to a user selection of the add-in from an add-in gallery.

11. The computer-implemented method of claim 8, wherein the application comprises a native application and wherein rendering the preview further comprises loading the preview of the add-in in the native application.

12. The computer-implemented method of claim 8, further comprising automatically selecting the template document based on one or more profile characteristics associated with a user account from which the add-in request has been communicated.

13. The computer-implemented method of claim 8, further comprising automatically selecting the template document based on one or more user preferences associated with a user that generated the preview request.

14. The computer-implemented method of claim 8, further comprising automatically selecting the template document based on a document history associated with a user that generated the preview request.

15. An apparatus comprising:
one or more computer readable storage media;
program instructions stored on the one or more computer readable storage media that, when executed by a processing system, direct the processing system to at least:
display an electronic document in an application, the electronic document comprising first data having a first plurality of values;
communicate a request to an app store for a preview of an add-in to the application;
receive, in reply to the request to the app store for the preview, the add-in and an automatically selected template document that includes second data the add-in may interact with, wherein the second data has a second plurality of values that are different than the first plurality of values;
render and display an interactive preview in a user interface to the application, wherein the interactive preview comprises the template document with the second data and the add-in, and wherein the second data in the template document may be interacted with via the interactive preview for modifying one or more display results of a feature supported by the add-in;
receive an interaction that edits a value of the second data in the template document;
modify, based on the received interaction, a display result of a feature supported by the add-in corresponding to the edited value;
communicate a request to the app store for a second template document to preview the add-in with;
receive the second template document; and
render and display a second interactive preview in the user interface to the application, wherein the second interactive preview comprises the second template document and the add-in, and wherein data in the second template document may be interacted with via the second interactive preview for modifying one or more display results of another feature supported by the add-in.

16. The apparatus of claim 15, wherein the application comprises a web-application hosted in a browser application and wherein to render the preview, the program instructions, when executed by the processing system, direct the processing system to at least:
load the preview of the add-in to the application in the browser application.

17. The apparatus of claim 15, wherein the application comprises a native application and wherein to render the preview, the program instructions, when executed by the processing system, direct the processing system to at least:
load the preview of the add-in in the native application.

18. The apparatus of claim 15, wherein the program instructions, when executed by the processing system, further direct the processing system to at least:
automatically select the template document based on one or more profile characteristics associated with a user account from which the add-in request has been communicated.

19. The apparatus of claim 15, wherein the program instructions, when executed by the processing system, further direct the processing system to at least:
automatically select the template document based on one or more user preferences associated with a user that generated the preview request.

20. The apparatus of claim 15, wherein the program instructions, when executed by the processing system, further direct the processing system to at least:
automatically select the template document based on a document history associated with a user that generated the preview request.

* * * * *